United States Patent [19]
Ainslie et al.

[11] Patent Number: 5,430,590
[45] Date of Patent: Jul. 4, 1995

[54] SPINDLE SYSTEM FOR A DISK DRIVE

[75] Inventors: Norman G. Ainslie, Anacortes, Wash.; David W. Albrecht, San Jose, Calif.; James W. Berberich, San Jose, Calif.; Daniel W. Chapman, San Jose, Calif.; Mats A. Engwall, Hollister, Calif.; Richard E. Mach, Los Gatos, Calif.; Zack D. Reynolds, San Jose, Calif.

[73] Assignee: International Business Machines Corporation, Armonk, N.Y.

[21] Appl. No.: 195,793

[22] Filed: Feb. 14, 1994

Related U.S. Application Data

[62] Division of Ser. No. 813,311, Dec. 23, 1991, Pat. No. 5,328,272.

[51] Int. Cl.$^6$ ............... G11B 17/08; F16C 17/10
[52] U.S. Cl. ............... 360/98.07; 360/99.08; 360/97.03; 384/112; 384/107; 384/115; 384/277
[58] Field of Search ............... 360/97.01–98.01, 360/98.07, 98.08, 99.04–99.12; 384/107, 112, 115, 123, 119, 124, 277, 446

[56] References Cited

U.S. PATENT DOCUMENTS

| | | | |
|---|---|---|---|
| 3,751,044 | 8/1973 | Sawada | 274/39 |
| 4,087,095 | 5/1978 | Koda | 274/9 |
| 4,366,993 | 1/1983 | Ono et al. | 308/9 |
| 4,567,081 | 10/1985 | Tanaka et al. | 384/107 |
| 4,656,545 | 4/1987 | Kakuta | 360/98 |
| 4,797,009 | 1/1989 | Yamazaki | 384/100 |
| 4,856,918 | 8/1989 | Inoue et al. | 384/610 |
| 4,930,907 | 6/1990 | Smith | 384/118 |
| 4,998,033 | 3/1991 | Hisabe et al. | 360/98.07 |
| 5,013,947 | 5/1991 | Ide | 360/98.07 |
| 5,018,880 | 5/1991 | Nakasugi et al. | 385/112 |
| 5,046,863 | 9/1991 | Sakatani et al. | 384/101 |
| 5,127,744 | 7/1992 | White et al. | 384/112 |
| 5,142,173 | 8/1992 | Konno et al. | 360/98.07 |
| 5,283,491 | 2/1994 | Jabbar et al. | 310/90 |

FOREIGN PATENT DOCUMENTS

| | | |
|---|---|---|
| 3819310 | 12/1989 | Germany . |
| 61-038217 | 2/1986 | Japan . |
| 61-236068 | 10/1986 | Japan . |
| 01167495 | 7/1989 | Japan . |

Primary Examiner—A. J. Heinz
Assistant Examiner—Jefferson Evans
Attorney, Agent, or Firm—Douglas R. Millett

[57] ABSTRACT

A spindle system is comprised or a journal and thrust air bearing. The journal bearing; has two sets of opposing groove areas. The thrust air bearing has two sets of spiral grooves. The thrust air bearing is gimballed to compensate for misaligment. A bias contact member is connected to the rotating member along the axis of rotation and provides electrical grounding, The spindle system is especially applicable to mounting recording disks in a data storage disk drive.

57 Claims, 4 Drawing Sheets

SPINDLE SYSTEM FOR A DISK DRIVE

The present application is a divisional application of Ser. No. 07/813,311, filed Dec. 23, 1991, now U.S. Pat. No. 5,328,272.

BACKGROUND OF THE INVENTION

1. Field of the Invention

This invention relates generally to disk drive systems and more particularly to a disk drive having an air bearing spindle.

2. Description of the Prior Art

Disk drives store data as magnetic transition marks on disk surfaces. The data is read by first moving a magnetic head to the desired track of the disk, then reading data as the disk rotates. In order to achieve faster access to the data (shorter latency time) it is necessary to increase the rotational speed of the disk spindle. However, traditional disk drive ball bearing spindles can only operate at rotational speeds less than approximately 8000 RPM for reasonable lifetimes. The ball bearings are not perfectly round and the ball bearing race within which they sit can deform slightly. In addition, the ball bearings are vibration generators. These problems cause the spindle axis to randomly or non-repeatably run out. This random fluctuation in the orientation and position of the rotational axis of the spindle effectively reduces both circumferential bit density and radial track density that may be achieved and hence the total data density of the disk drive.

One solution to this problem is to use air bearing spindles. Some examples of air bearing spindles include U.S. Pat. No. 3,751,044 issued Aug. 7, 1973; U.S. Pat. No. 4,087,095 issued May 2, 1978; U.S. Pat. No. 4,366,993 issued Jan. 4, 1983; U.S. Pat. No. 4,547,081 issued Oct. 15, 1985; U.S. Pat. No. 4,656,545 issued Apr. 7, 1987; U.S. Pat. No. 4,797,009 issued Jan. 10, 1989; U.S. Pat. No. 4,856,918 issued Aug. 15, 1989; German patent application 3819310 published Dec. 14, 1989; Japanese patent application 01-167495 published Jul. 3, 1989; Japanese patent application 61-236068 published Oct. 21, 1986; and Japanese patent application 61-38217 published Feb. 24, 1986.

A number of problems have been encountered with implementing air bearing spindles in disk drives. Air pumps may be used to provide a supply of pressurized air. Such pumps increase the complexity and cost of the system. Self-generating air bearings have been used, but they have proved inadequate in providing a sufficient thrust bearing at higher loads. Alignment between the thrust and axial bearings is also very difficult. Air flow from the air bearings may contaminate the recorded disks. What is needed is a practical air bearing spindle for a disk drive which is able to operate at high rotation speeds.

SUMMARY OF THE INVENTION

In accordance with the present invention, an air bearing spindle is comprised of a journal air bearing and a thrust air bearing. The journal bearing comprises a rotatable cylinder located within a stationary cylinder. The rotatable cylinder has an outer surface having a first set of grooves located at one end of the cylinder and a second set of grooves located at the other end of the cylinder. The first set of grooves has a length greater than the second set of grooves such that a net air flow through the bearing is achieved.

The thrust bearing comprises a stationary thrust member attached to the stationary cylinder and a rotatable thrust member attached to the rotatable cylinder. The stationary thrust member has an air bearing surface having a first and a second set of spiral grooves which draw air inward and provide an evenly distributed air bearing. The stationary thrust member is connected to the stationary cylinder by a flexible connector which compensates for misalignment between the journal and thrust bearings. The rotational thrust member has an electrical grounding system which contacts an outside grounding member along an axial direction. The spindle also has an air filtering system.

For a fuller understanding of the nature and advantages of the present invention reference should be made to the following detailed description taken in conjunction with the accompanying drawings.

DESCRIPTION OF THE PREFERRED EMBODIMENTS

Figure 1:
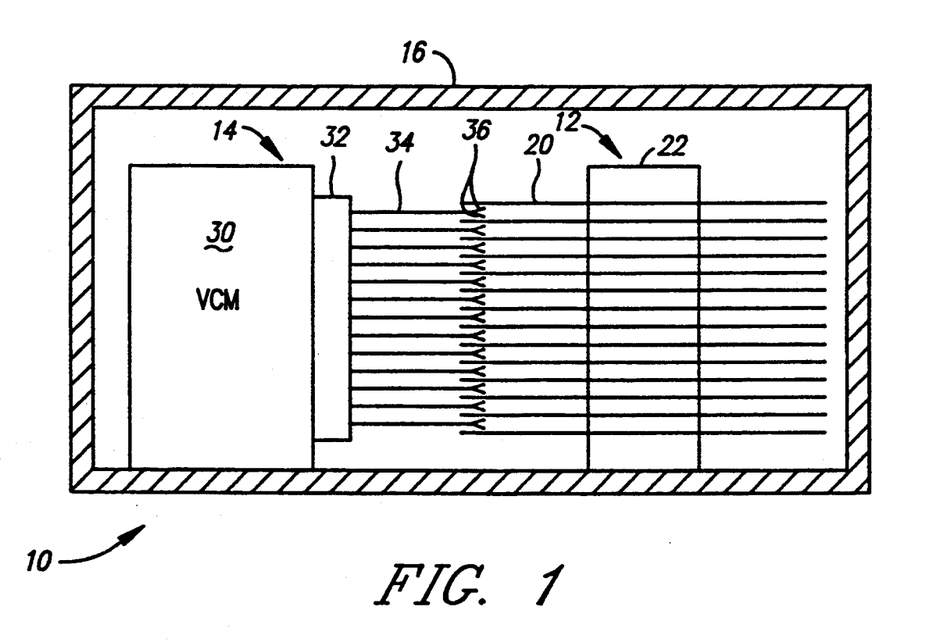
FIG. 1 is a schematic diagram of a disk drive system of the present invention.

FIG. 1 is a schematic diagram of a disk drive system of the present invention and is designated by the general reference number 10. System 10 comprises a disk spindle assembly 12 and a head actuator assembly 14. Spindle assembly 12 and head actuator assembly 14 are located within a sealed enclosure 16 in order to prevent particulate contamination.

Spindle assembly 12 comprises a plurality of magnetic recording disks 20 which are mounted to a spindle 22. Spindle 22 is rotated by an in-hub electrical motor (not shown).

Head actuator assembly 14 comprises a voice coil motor 30 which moves an actuator arm assembly 32 in a radial direction relative to the disks 20. Assembly 32 has a plurality of actuator arms 34, each of which corresponds to a space between two of the disks 20. Each actuator arm 34 has a pair of read/write heads 36. One head is positioned to read the disk above and the other head is positioned to read the disk below the actuator arm 34.

In operation, spindle 22 is rotated and motor 30 moves the actuator arms 34 between the disks 20 to the desired track location. One of the heads 36 then reads the data recorded on the desired track.

Figure 2:
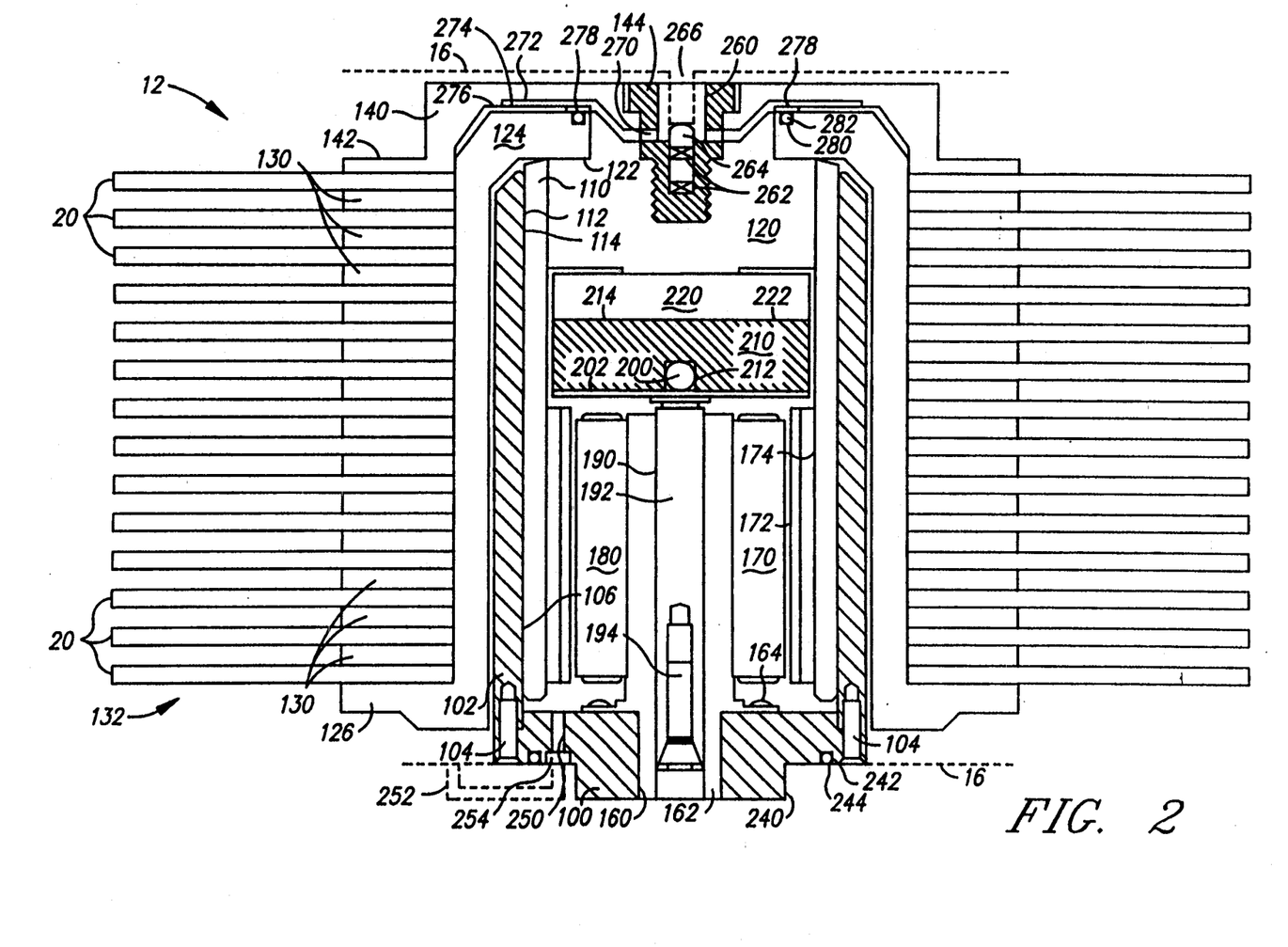
FIG. 2 is a cross-sectional view of the disk spindle assembly of the present invention.

FIG. 2 shows a cross-sectional view of the spindle assembly 12. A base member 100 is attached to a stationary cylindrical sleeve 102 by a plurality of screws 104 or other suitable attachment process such as adhesive bonding. Sleeve 102 has an inner surface 106 which is an air bearing surface.

A rotatable cylindrical shaft 110 fits inside sleeve 102. Shaft 110 has an outer surface 112 which is an air bearing surface. There is a gap 114 between the sleeve 102 and shaft 110 sufficient to form an air bearing, which in the preferred embodiment is a gap of approximately 5 microns.

A shaft insert 120 is shaped to fit inside the top portion of shaft 110. Insert 120 is attached to shaft 110 by an interference shrink fit made before final machining of surface 112. Insert 120 has a ledge portion 122 for receiving a disk stack hub or holder 124. Holder 124 is shrink fitted to insert 120. Holder 124 is cylindrical in shape and fits over sleeve 102. The radial clearance between holder 124 and sleeve 102 is large enough that no air bearing is formed, and in a preferred embodiment the gap is approximately 0.4 mm. The bottom of holder 124 has a flange 126.

A plurality of magnetic recording disks 20 and annular spacer members 130 fit over holder 124 and rests on flange 126. The disks 20 and spacers 130 are arranged in an alternating manner and comprise a disk stack 132. A disk clamp 140 fits over the disk stack 132 and holds it in place. Clamp 140 has a flange 142 which corresponds to flange 126 of holder 124. Clamp 140 is attached firmly to insert 120 by means of a clamping screw 144, holding the disk stack 132 together and in its place.

Base 100 has an aperture 160 for receiving a motor mounting post 162. Post 162 is attached to base 100 by a plurality of screws 164 or an interference shrink fit. A stator winding assembly 170 is attached to post 162. A plurality of rotor magnets 172 are attached to a cylindrical magnetic mounting member 174, also known as backing iron, which in turn is attached to the inside surface of shaft 110. Alternatively, magnets 172 could be made of a single cylinder of magnetic material that has been magnetized with a plurality of alternating magnetic sections (poles). The winding assembly 170, rotor magnets 172 and member 174 comprise an in-hub brushless spindle DC motor 180 which rotates the shaft 110. An eight pole, twelve slot delta wound brushless DC spindle motor may be used in the preferred embodiment.

Post 162 has a central passage 190 which is located along the axis of the shaft 102. The passage 190 receives a collet rod 192. The rod 192 receives a wedge-shaped locking screw 194. The wedge-shaped portion of screw 194 mates with a conical seat of rod 192. During assembly, rod 192 may be adjusted in its vertical axial position and then locked into place by tightening screw 194. Screw 194 expands rod 192 and holds it tightly against the inside of passage 190.

A stainless steel circular diaphragm spring plate 202 is weld bonded to the top of post 192. A stationary cylindrical thrust beating member 210 is attached to the top of the plate 202 by a weld bonding process. A pivot ball 200 is interference fitted into a socket 212 of member 210. The resulting assembly allows member 210 to gimbal about the contact point between ball 200 and plate 202. Member 210 has a top surface 214 which is an air beating surface.

A cylindrical rotatable thrust member 220 is attached to an insert 120. Member 220 has a surface 222 which is an air bearing surface which abuts surface 214. The diameter of member 220 is less than the outside diameter of insert 120. This difference in diameter helps to prevent distortion of the critical surface 222 by the pressure exerted by shaft 110 on insert 120 during and after the assembly process.

Base 100 fits into a recess 240 of enclosure 16 and is preferably attached by a means of a plurality of screws (not shown). Base 100 has a circular groove 242 which contains an elastomeric O-ring 244. O-ring 244 forms a seal between base 100 and enclosure 16. Base 100 has an air passage 250 which connects the interior of the sleeve 102 to the enclosure 16. Enclosure 16 has an air passage 252 which connects passage 250 to the area outside the spindle assembly 12. A filter 254 is located inside passage 250.

Clamping screw 144 has an aperture 260 located along the central axis of the sleeve 102. Aperture 260 contains a pair of repelling disk-shaped magnets 262. An electrically conductive ceramic contact member 264 rests in passage 260 on top of one of the magnets 262. A post 266 (shown by dotted line) extends from the top of enclosure 16 into aperture 260 and contacts member 264. The repelling force of the magnets 262 hold member 264 against post 266 with an upward force of a few grams. The member 264 and post 266 provide electrical grounding for the disks 20.

Clamping screw 144 has a plurality of air apertures 270 located proximate to the point of contact between the member 264 and post 266. The apertures 270 connect the inside of aperture 260 to an air passage 272. Passage 272 is formed between clamp 140 and the insert 122 and holder 124. A filter 274 is attached between a surface 276 of clamp 140 and a washer 278. Holder 124 has a circular groove 280 for receiving an elastomeric O-ring 282. When clamp 140 is attached to holder 124 a seal is formed between washer 278 and holder 124. The result is that filter 274 completely blocks passage 272 thereby trapping particles generated by the wear of member 264.

In the preferred embodiment, base 100, sleeve 102, shaft 110, insert 120, clamp 140, screw 144, rod 192, thrust members 210 and 220 and washer 278 are all made of hardened stainless steel in order to provide long life and corrosion resistance. The use of a single material also helps to reduce thermal distortions during operation. The primary exceptions are the mounting post 162 and holder 124, which are both made of aluminum and mounting member 174 which is made of soft iron. Post 162 is made of aluminum in order to boost the heat transfer out of the motor and holder 124 is made of aluminum in order to more closely match the thermal expansion of disks 20 and spacers 130.

Figure 3:
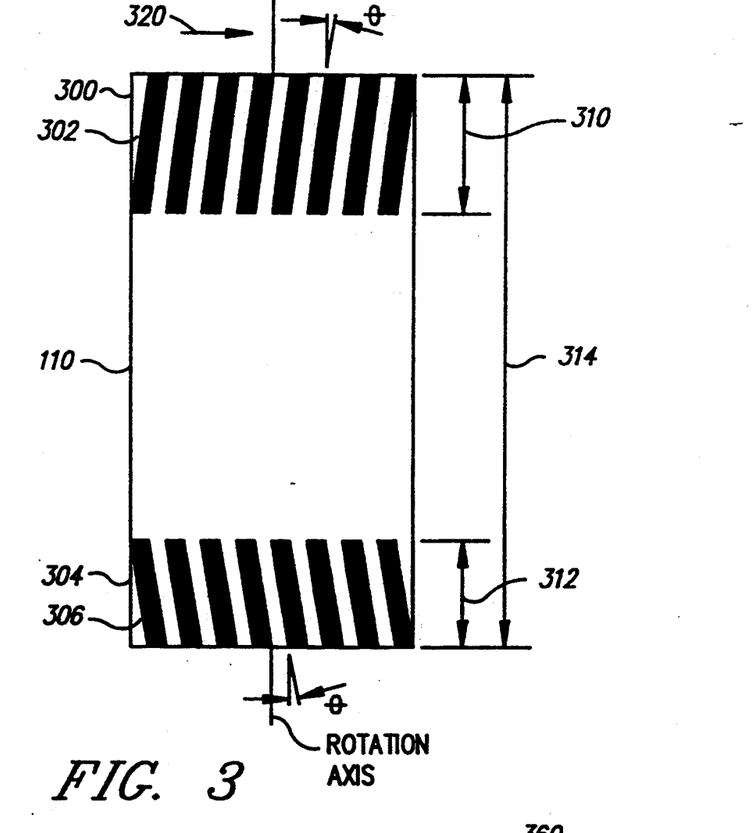
FIG. 3 is a side view of the rotatable shaft of the present invention.

FIG. 3 shows a side view of shaft 110. Shaft 110 has an upper groove area 300 having grooves 302 and a lower groove area 304 having grooves 306. Grooves 302 are designed to pull air downward into the air bearing gap 114. Grooves 306 are designed to pull air upward into the air bearing gap 114. Groove area 300 has a length 310 which is preferably 13 mm. Groove area 304 has a length 312 which is preferably 10 mm. The shaft 110 has a length 314 which is preferably 57 mm and has an outer diameter of preferably 34.75 min.

Grooves 302 and 306 have depths of preferably 2.5 microns and a groove width of preferably 2.0 mm. The spacing between the grooves is preferably 2.0 mm. The grooves 302 and 306 have a groove angle Θ which is preferably 19°. Note that the groove angle for grooves 306 is the reverse of that for grooves 302. The grooves 302 and 306 are formed by photolithographic etching processes for stainless steel.

In operation, shaft 110 rotates such that the outer surface shown in FIG. 3 is rotating to the fight in the direction indicated by arrow 320. Grooves 302 draw air downward and grooves 306 draw air upward to form the air bearings. The air bearings are formed in the groove area 300 and 304 as well as the intermediate region between these two groove areas. The result is that high radial stiffness is achieved at both ends of shaft 110 such that a smooth and accurate bearing is achieved. Length 310 is greater than length 312 and a net air flow downward through the bearing results.

Figure 4:
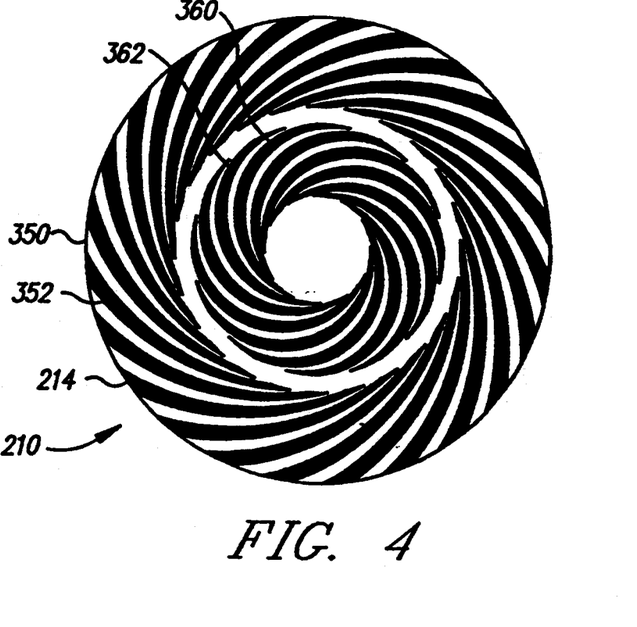
FIG. 4 is a top view of the stationary thrust member of the present invention.

FIG. 4 shows a top view of surface 214 of member 210. Surface 214 has an outer groove area 350 having spiral grooves 352 and an inner groove area 360 having spiral grooves 362. The diameter of member 210 is preferably 30 mm. Area 350 has an outer diameter of 30 mm and an inner diameter of 18.24 mm. Grooves 352 have a spiral angle of 15°. There are 24 equally spaced grooves 352 each of which have a depth of approximately 2.5 microns. Groove area 360 has an outer diameter of 17.46 mm and an inner diameter of 6.48 mm. Grooves 362 have a spiral angle of 15°. There are 12 equally spaced grooves 362 each of which have a depth of approximately 2.5 microns. In both areas 350 and 360, the width of the grooves is equal to the width of the non-groove areas. The grooves 352 and 362 are formed by photolithographic etching processes for stainless steel. Although two sets of grooves are shown in the preferred embodiment, three or more sets of grooves could also be used.

During operation, thrust member 210 remains rotationally stationary with respect to sleeve 102, and thrust member 220, connected to shaft 110, rotates above it. In FIG. 4, member 220 would be located directly above and parallel to member 210 and member 220 would rotate counterclockwise relative to member 210. The grooves 352 and 362 draw the air inward to form the air bearing. The two sets of grooves allow the inner set to have a fewer number of grooves than the outer set. This is important in manufacturing the grooves because the grooves must become smaller as they approach the center. There is a limit as to how small the grooves can be made. A single set of multiple grooves would not be able to extend as far to the center of the bearing member 210 as the two sets of grooves of the present invention. In addition, the geometries of the two sets of grooves can be optimized for their respective locations. The end result is a more uniform thrust bearing which is able to support higher loads.

The operation of the spindle assembly 12 may now be understood. Initially shaft 110 is at rest and member 220 rests on member 210. The motor 180 is energized and causes shaft 110 to rotate. Air is pulled from the outside between holder 124 and sleeve 102 and into the air bearing gap 114. An air bearing is formed in gap 114. A net air flow is achieved through gap 114 from top to bottom. The air then exits the motor area via passages 250 and 252. The filtered air is then returned to the disk area.

Member 220 rotates relative to member 222 and air is drawn into the space between and thereby an air bearing is formed. The ball 200 and plate 202 allow member 210 to pivot and maintain the air bearing. This action compensates for any orthogonal (out of square) misalignment between surface 222 and the shaft surface 112 which may have occurred during manufacture.

During rotation, member 264 contacts post 266 to provide electrical grounding for the disks 20. This is necessary to prevent the read/write heads 36 from being damaged by potential differences that would otherwise develop between the disks and heads. If not for the member 264 and post 266, the disks 20 would be effectively electrically insulated from the enclosure and from common electrical grounding conductors by the formation of the air bearings themselves.

The member 264 contacts post 266 with relatively little force. However, some wear does occur. Harmful particles may be generated by this wearing action. The rotation of the shaft 110 causes air to be drawn into the aperture 260 and flow through passage 272. Any wear particles are thereby trapped against filter 274 and are prevented from reaching the disk area.

Figure 5:
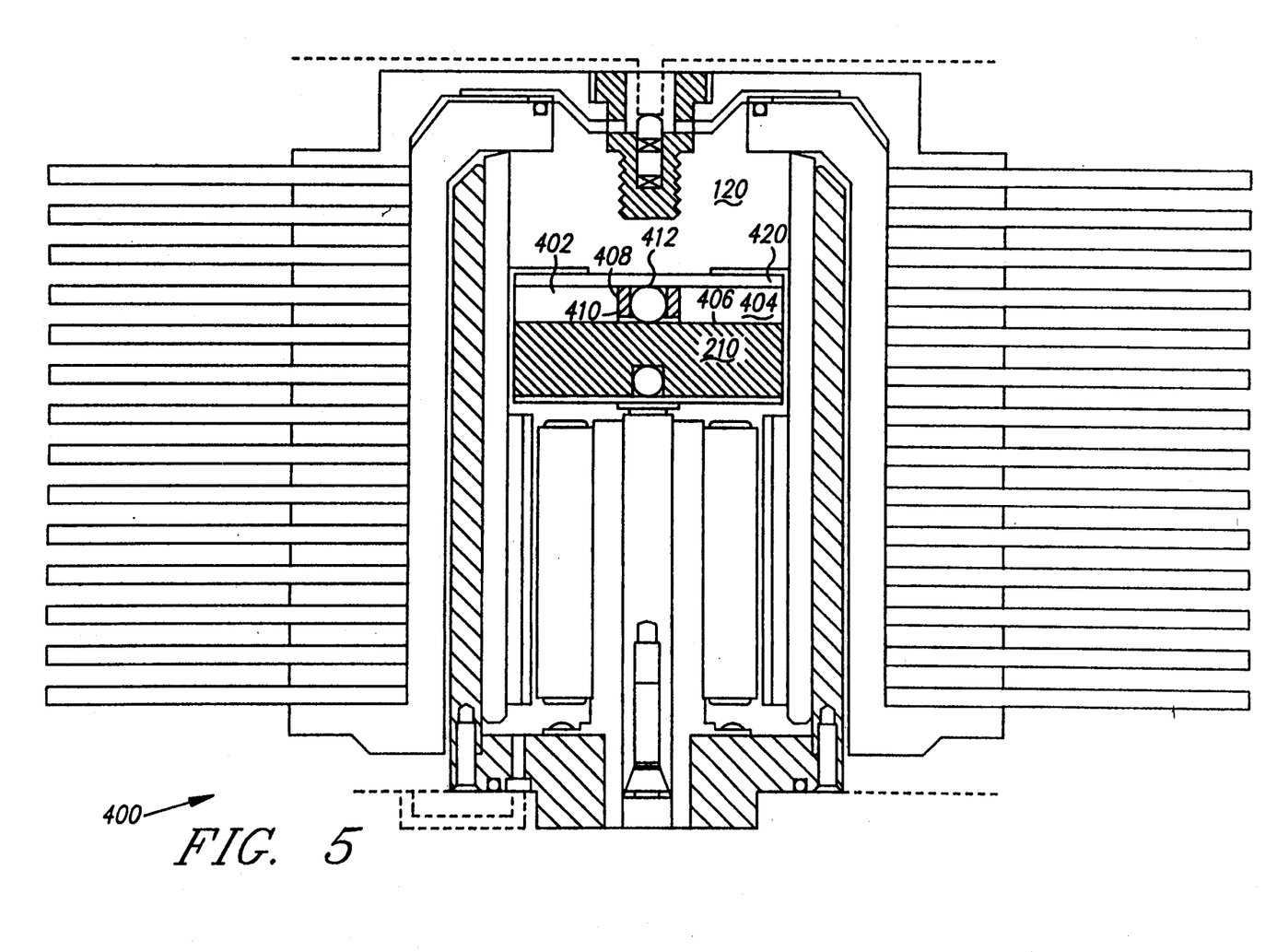
FIG. 5 is a cross-sectional view of an alternative embodiment of the disk spindle assembly of the present invention.

FIG. 5 shows an alternative embodiment of the spindle assembly of the present invention and is designated by the general reference number 400. Assembly 400 is similar to assembly 10 with the exception of member 220. A rotatable thrust bearing member 402 and a blocking plate 420 replaces member 220. Member 402 has a cylindrical member 404 which has an air bearing surface 406. Member 404 has an aperture 408 which receives a gage block assembly 410. Gage block assembly 410 contains a precision stationary ball bearing which is mounted in the gage block by a shrink fit process. Assembly 410 is mounted in aperture 408 along the central axis of shaft 110 such that ball 412 extends a distance beyond the surface 406, but less than the height of the air bearing which results at running speeds between member 402 and member 210. This distance at running speed is also known as the flying height of the air bearing. The gage block assembly 410 is attached to the member 404 by anodic bonding. The block 410 and member 404 are then bonded to a blocking plate 420. Plate 420 is attached to insert 120. As an alternative, ball 412 may be allowed to rotate by eliminating the shrink fit between the ball 412 and assembly 410. Alternatively, the separate gage block 410 may be eliminated and ball 412 may be centered in member 404 to separate the air beating surfaces at low speeds.

The operation of assembly 400 may now be understood. During the start up period, the member 402 must go from zero RPM to running speed, typically greater than 6000 RPM. The air bearing does not form until member 402 reaches 500 RPM. During this critical start up period, the member 402 contacts member 210 at a single point where ball 412 touches member 210. This point contact significantly reduces the friction torque so that the spindle may accelerate rapidly. The rapid acceleration allows the air bearing to be formed after only a few revolutions. At this point, the member 402 lifts away from member 210 and ball bearing 412 no longer is in contact with member 210. Wear is reduced and the lower starting torque is less taxing of the motor.

While the preferred embodiments of the present invention have been illustrated in detail, it should be apparent that modifications and adaptations to those embodiments may occur to one skilled in tile art without departing from the scope of the present invention as set forth in tile following claims.

What is claimed is:

1. A data storage system comprising:
   a first bearing member having an inner cylindrical fluid bearing surface;
   a second bearing member located within the first bearing member, the second bearing member having an outer cylindrical fluid bearing surface corresponding to the fluid bearing surface of the first bearing member;
   a first thrust member having a fluid bearing surface;
   a second thrust member connected to the second bearing member, the second thrust member having a fluid bearing surface corresponding to the fluid bearing surface of the first thrust member;

a flexible connector means for connecting the first thrust member to the first bearing member such that the position of the first thrust member may adjust in order to maintain the fluid bearing between the fluid bearing surfaces of the first and second thrust members;

a data storage medium connected to the second bearing member;

a rotational movement means for rotating the data storage medium;

a transducer located proximate the data storage medium; and a transducer movement means connected to the transducer for moving the transducer relative to the data storage medium.

2. The system of claim 1, wherein the flexible connector means comprises a gimbal assembly and a biasing means.

3. The system of claim 2, wherein the biasing means comprises a flexible plate.

4. The system of claim 1, wherein the flexible connector means comprises a ball and socket.

5. The system of claim 4, further including a flexible plate connected to the ball and socket.

6. The system of claim 1, wherein the fluid bearing surface of the second bearing member has a plurality of grooves.

7. The system of claim 1, wherein the fluid bearing surface of the second bearing member has a first set of grooves located at a first end of the second bearing member and a second set of grooves located at a second end of the second bearing member.

8. The system of claim 7, wherein the first set of grooves has a length greater than the second set of grooves.

9. The system of claim 1, wherein the fluid bearing surface of the first thrust member has a plurality of grooves.

10. The system of claim 1, wherein the fluid bearing surface of the first thrust member has an outer annular area containing a first set of grooves and an inner annular area containing a second set of grooves.

11. The system of claim 1, further comprising an electrical grounding means for electrically connecting the second bearing member to a grounding member.

12. The system of claim 11, wherein the electrical grounding means comprises a conducting member electrically connected to the second bearing member and having an aperture located along a central axis of the second bearing member, and a biasing means located within the aperture and a contact member located between the biasing means and the grounding member, such that the biasing means holds the contact member against the grounding member.

13. The system of claim 12, wherein the biasing means comprises a pair of repelling magnets.

14. The system of claim 12, wherein the conducting member has an air passage having an inlet in the aperture proximate the contact member and having an outlet at a peripheral surface of the conducting member, the air passage having a filter located between the inlet and the outlet.

15. The system of claim 1, wherein the first thrust member is connected to the first bearing member via an axial adjustment means for providing adjustment of the location of the first thrust member along an axial dimension of the first bearing member.

16. The system of claim 1, wherein the rotational movement means comprises a motor located within the second bearing member for moving the second bearing member relative to the first bearing member.

17. The system of claim 1, wherein the fluid located between the fluid bearing surfaces is comprised primarily of air.

18. The system of claim 1, further comprising:

an inner chamber formed within the first and second bearing members, the inner chamber having an outlet passage connecting the inner chamber to an exterior of the spindle system, the outlet passage having a filter located across a portion of the outlet passage, and wherein the fluid bearing between the fluid bearing surfaces of the first and second bearing members creates a net fluid flow through the fluid bearing, into the inner chamber and out through the outlet passage.

19. The system of claim 1, further including a point contact member connected to the second thrust member and extending a distance beyond the air bearing surface of the second thrust member a distance less than a flying height of the fluid bearing surface.

20. A spindle system comprising:

a first bearing member having an inner cylindrical fluid bearing surface;

a second bearing member located within the first bearing member, the second bearing member having an outer cylindrical fluid bearing surface corresponding to the fluid bearing surface of the first bearing member;

a first thrust member located within the second bearing member, the first thrust member having a fluid bearing surface;

a second thrust member located within and connected to the second bearing member, the second thrust member having a fluid bearing surface corresponding to the fluid bearing surface of the first thrust member; and a flexible connector means for connecting the first thrust member to the first bearing member such that the position of the first thrust member may adjust in order to maintain the fluid bearing between the fluid bearing surfaces of the first and second thrust members;

a data storage medium connected to the second bearing member;

a rotational movement means for rotating the data storage medium;

a transducer located proximate the data storage medium; and a transducer movement means connected to the transducer for moving the transducer relative to the data storage medium.

21. The system of claim 20, wherein the flexible connector means comprises a gimbal assembly and a biasing means.

22. The system of claim 21, wherein the biasing means comprises a flexible plate.

23. The system of claim 20, wherein the flexible connector means comprises a ball and socket.

24. The system of claim 23, further including a flexible plate connected to the ball and socket.

25. The system of claim 20, wherein the fluid bearing surface of the second bearing member has a plurality of grooves.

26. The system of claim 20, wherein the fluid bearing surface of the second bearing member has a first set of grooves located at a first end of the second bearing member and a second set of grooves located at a second end of the second bearing member.

27. The system of claim 26, wherein the first set of grooves has a length greater than the second set of grooves.

28. The system of claim 20, wherein the fluid bearing surface of the first thrust member has a plurality of grooves.

29. The system of claim 20, wherein the fluid bearing surface of the first thrust member has an outer annular area containing a first set of grooves and an inner annular area containing a second set of grooves.

30. The system of claim 20, further comprising an electrical grounding means for electrically connecting the second bearing member to a grounding member.

31. The system of claim 30, wherein the electrical grounding means comprises a conducting member electrically connected to the second bearing member and having an aperture located along a central axis of the second bearing member, and a biasing means located within the aperture and a contact member located between the biasing means and the grounding member, such that the biasing means holds the contact member against the grounding member.

32. The system of claim 31, wherein the biasing means comprises a pair of repelling magnets.

33. The system of claim 31, wherein the conducting member has an air passage having an inlet in the aperture proximate the contact member and having an outlet at a peripheral surface of the conducting member, the air passage having a filter located between the inlet and the outlet.

34. The system of claim 20, wherein the first thrust member is connected to the first bearing member via an axial adjustment means for providing adjustment of the location of the first thrust member along an axial dimension of the first bearing member.

35. The system of claim 20, wherein the rotational movement means comprises a motor located within the second bearing member for moving the second bearing member relative to the first bearing member.

36. The system of claim 20 wherein the fluid located between the fluid bearing surfaces is comprised primarily of air.

37. The system of claim 20, further comprising:
an inner chamber formed within the first and second bearing members, the inner chamber having an outlet passage connecting the inner chamber to an exterior of the spindle system, the outlet passage having a filter located across a portion of the outlet passage, and
wherein the fluid bearing between the fluid bearing surfaces of the first and second bearing members creates a net fluid flow through the fluid bearing, into the inner chamber and out through the outlet passage.

38. The system of claim 20, further including a point contact member connected to the second thrust member and extending a distance beyond the air bearing surface of the second thrust member a distance less than a flying height of the fluid bearing surface.

39. A spindle system comprising:
a first bearing member having an inner cylindrical fluid bearing surface;
a second bearing member located within the first bearing member, the second bearing member having an outer cylindrical fluid bearing surface corresponding to the fluid bearing surface of the first bearing member;
a first thrust member located within the second bearing member, the first thrust member having a fluid bearing surface;
a second thrust member located within and connected to the second bearing member, the second thrust member having a fluid bearing surface corresponding to the fluid bearing surface of the first thrust member; and
a pivoting connector for connecting the first thrust member to the first bearing member such that the first thrust member is allowed to pivot about a point along a central axis of the second bearing member such that the position of the first thrust member may adjust in order to maintain the fluid bearing between the fluid bearing surfaces of the first and second thrust members;
a data storage medium connected to the second bearing member;
a rotational movement means for rotating the data storage medium;
a transducer located proximate the data storage medium; and
a transducer movement means connected to the transducer for moving the transducer relative to the data storage medium.

40. The system of claim 39, wherein the pivoting connector comprises a gimbal assembly and a biasing means.

41. The system of claim 40, wherein the biasing means comprises a flexible plate.

42. The system of claim 39, wherein the pivoting connector comprises a ball and socket.

43. The system of claim 42, further including a flexible plate connected to the ball and socket.

44. The system of claim 39, wherein the fluid bearing surface of the second bearing member has a plurality of grooves.

45. The system of claim 39, wherein the fluid bearing surface of the second bearing member has a first set of grooves located at a first end of the second bearing member and a second set of grooves located at a second end of the second bearing member.

46. The system of claim 45, wherein the first set of grooves has a length greater than the second set of grooves.

47. The system of claim 39, wherein the fluid bearing surface of the first thrust member has a plurality of grooves.

48. The system of claim 39, wherein the fluid bearing surface of the first thrust member has an outer annular area containing a first set of grooves and an inner annular area containing a second set of grooves.

49. The system of claim 39, further comprising an electrical grounding means for electrically connecting the second bearing member to a grounding member.

50. The system of claim 49, wherein the electrical grounding means comprises a conducting member electrically connected to the second bearing member and having an aperture located along a central axis of the second bearing member, and a biasing means located within the aperture and a contact member located between the biasing means and the grounding member, such that the biasing means holds the contact member against the grounding member.

51. The system of claim 50, wherein the biasing means comprises a pair of repelling magnets.

52. The system of claim 51, wherein the conducting member has an air passage having an inlet in the aperture proximate the contact member and having an outlet at a peripheral surface of the conducting member, the air passage having a filter located between the inlet and the outlet.

53. The system of claim 39, wherein the first thrust member is connected to the first bearing member via an axial adjustment means for providing adjustment of the location of the first thrust member along an axial dimension of the first bearing member.

54. The system of claim 39, wherein the rotational movement means comprises a motor located within the second bearing member for moving the second bearing member relative to the first bearing member.

55. The system of claim 39, wherein the fluid located between the fluid bearing surfaces is comprised primarily of air.

56. The system of claim 39, further comprising:
an inner chamber formed within the first and second bearing members, the inner chamber having an outlet passage connecting the inner chamber to an exterior of the spindle system, the outlet passage having a filter located across a portion of the outlet passage, and
wherein the fluid bearing between the fluid bearing surfaces of the first and second bearing members creates a net fluid flow through the fluid bearing, into the inner chamber and out through the outlet passage.

57. The system of claim 39, further including a point contact member connected to the second thrust member and extending a distance beyond the air bearing surface of the second thrust member a distance less than a flying height of the fluid bearing surface.

* * * * *